(12) United States Patent
Davis

(10) Patent No.: US 6,609,690 B1
(45) Date of Patent: Aug. 26, 2003

(54) APPARATUS FOR MOUNTING FREE SPACE OPTICAL SYSTEM EQUIPMENT TO A WINDOW

(75) Inventor: Eric Joseph Davis, Redmond, WA (US)

(73) Assignee: Terabeam Corporation, Kirkland, WA (US)

( * ) Notice: Subject to any disclaimer, the term of this patent is extended or adjusted under 35 U.S.C. 154(b) by 0 days.

(21) Appl. No.: 10/010,350

(22) Filed: Dec. 5, 2001

(51) Int. Cl.[7] .............................................. H04B 10/00
(52) U.S. Cl. ...................... 248/208; 248/906; 248/583; 248/278.1; 248/200.1
(58) Field of Search ................................ 248/208, 906, 248/583, 278.1, 200.1

(56) References Cited

U.S. PATENT DOCUMENTS

| | | | | |
|---|---|---|---|---|
| 3,941,001 A | * | 3/1976 | LaSarge | 74/5.2 |
| 4,232,361 A | * | 11/1980 | Kelsall | 362/364 |
| 5,505,419 A | * | 4/1996 | Gabrius | 248/343 |
| 5,526,433 A | * | 6/1996 | Zakarauskas et al. | 381/92 |

OTHER PUBLICATIONS

Publication No: US2002/0131130 A1, Clark.*
Publication No: US 2002/0149811 A1, Willebrand.*

\* cited by examiner

*Primary Examiner*—Leslie A. Braun
*Assistant Examiner*—Ingrid Weinhold
(74) *Attorney, Agent, or Firm*—Blakely Sokoloff Taylor & Zafman LLP

(57) ABSTRACT

An apparatus and method for mounting free-space optical communications system (FSO) equipment to a window. The apparatus includes a substantially rectangular frame member in which a central opening is defined. In one embodiment, the frame member comprises an extrusion that may be cut to a desired length to fit various window widths. The frame member is coupled to a window frame or the window via a plurality of universal mounting brackets. A support that is operatively coupled to the frame member provides a mounting interface to couple to an FSO terminal that is disposed within the central opening. In one embodiment, the support comprises a gimbaled support that enables the FSO terminal to be rotated about a pair of orthogonal spin axes. A valance is provided to prevent undesired access to the gimbaled support and FSO terminal and make the apparatus appear less obtrusive.

24 Claims, 12 Drawing Sheets

APPARATUS FOR MOUNTING FREE SPACE OPTICAL SYSTEM EQUIPMENT TO A WINDOW

BACKGROUND OF THE INVENTION

1. Field of the Invention

The present invention generally relates to free-space optical communications systems, and, more specifically, to an apparatus for mounting free space optical communications system equipment to a window or window frame.

2. Background Information

With the increasing popularity of wide area networks (WANs), such as the Internet and/or the World Wide Web, network growth and traffic has exploded in recent years. Network users continue to demand faster networks and more access for both businesses and consumers. As network demands continue to increase, existing network infrastructures and technologies are reaching their limits.

An alternative to present day hardwired or fiber network solutions is the use of wireless optical communications. Wireless optical communications utilize point-to-point communications through free-space and therefore do not require the routing of cables or fibers between locations. Thus, wireless optical communications are also known as free-space or atmospheric optical communications. For instance, in a free-space optical communication system, a beam of light is directed through free-space from a transmitter at a first location to a receiver at a second location. Data or information is encoded into the beam of light, and therefore, the information is transmitted through free-space from the first location to the second location.

A conventional free-space optical system is shown in FIGS. 1A and 1B. The free-space optical system includes a pair of terminals (i.e., transceivers) 110 that are typically located on or in separate buildings or towers, such as depicted by buildings 111 and 112. Each terminal 110 includes a primary collector 113 to which a secondary mirror 114 is coupled via a plurality of rigid struts 116. The terminals further include a transmitted signal lens 118 mounted within secondary mirror 114, and a set of transmitter/receiver optics and electronics 120. All of components 113, 114, 116, 118, and 120 are operatively coupled to a yoke that is connected to a base 122 via a gimbal assembly, such that these components are all moved in response to a gimbaled movement of the yoke relative to a static surface on which the base 122 is placed. In the illustrated configuration, terminals 110 are disposed in respective office in buildings 111 and 112, and the optical signals transmitted and received by the terminals pass through windows 134 and 136.

With reference to FIG. 1B, data is transmitted from a 110T to a terminal 110R in the following manner, wherein the suffix "T" indicates components corresponding to transmitter operations, and the suffix "R" indicates components corresponding to receiver operations. An optical signal 124 is generated by transmitter/receiver optics and electronics 120T of terminal 110T and directed through and opening 126T defined in primary collector 113T towards transmitted signal lens 118T, which produces a collimated signal 128. As collimated signal 128 moves toward terminal 110R, in the width of the signal diverges very gradually. As will be recognized by those skilled in the art, the divergence of the various optical signals depicted in the Figures contained herein are exaggerated for clarity. Upon reaching terminal 110R, the outer portions of collimated signal 128 impinge upon primary collector 113R, which comprises a concave mirrored surface that redirects those portions of the signal that impinge upon it toward secondary mirror 114R, while an inner portion 132 of the collimated signal is substantially blocked. Collimated signal 128 is then reflected by secondary mirror 114R towards the secondary mirror's focal point 130, where it is received by transmitter/receiver optics and electronics 120R.

The convention terminal mounting technique that employs the base and gimbaled assembly discussed above has several drawbacks. One drawback is that since the base is typically mounted on a floor, the terminal is susceptible to floor motion, such as vibrations caused by people and/or equipment in offices or rooms in which the terminal is located. The conventional terminal is also somewhat obtrusive, occupying a significant amount of office space. Furthermore, the conventional mounting technique enables users to potentially cause damage to a terminal and interfere with received or transmitted signals.

SUMMARY OF THE INVENTION

The present invention provides an apparatus and method for mounting a free-space optical communications system (FSO) equipment, such as a terminal, to a window. The apparatus includes a substantially rectangular frame member in which a central opening is defined. In one embodiment, the frame member comprises an extrusion that may be cut to a desired length to fit various window widths. The frame member is coupled to a window frame or the window via a plurality of universal mounting brackets that are disposed toward respective corners of the frame member. A support that is operatively coupled to the frame member provides a mounting interface to couple the frame to an FSO terminal that is disposed within the central opening. In one embodiment, the support comprises a gimbaled support that enables the FSO terminal to be rotated about a pair of orthogonal spin axes and then locked into place once a desired pointing is obtained. In typical installations, the apparatus is mounted toward the top of a window frame and a valance is provided to prevent undesired access to the gimbaled support and FSO terminal and make the apparatus appear less obtrusive.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 7A, 7B, and 7C respectively show different positions of the gimbaled assembly, wherein FIG. 7A illustrates in initial position, FIG. 7B shows a rotate about the elevational axis and FIG. 7C shows a rotation about the azimuth spin axis;

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In one example embodiment of the present invention, point-to-point free-space optical communications are provided from a transmitter to a receiver. The transmitter and receiver may be located at the same location or at different locations such as on different buildings within a line of sight of each other. It is appreciated that the transmitter and the receiver may be parts of transceivers, or transmitter-receiver combinations, at their respective locations, such that bi-directional communications are provided. In the example embodiment, the transmitter includes an optical source that generates an optical communications beam, such as a laser beam or the like, on which data or information is modulated. The optical communications beam is not limited to being monochromatic or to any particular wavelength or color and may include the visible light as well as ultra violet or infra-red portions of the spectrum.

Figure 1A:
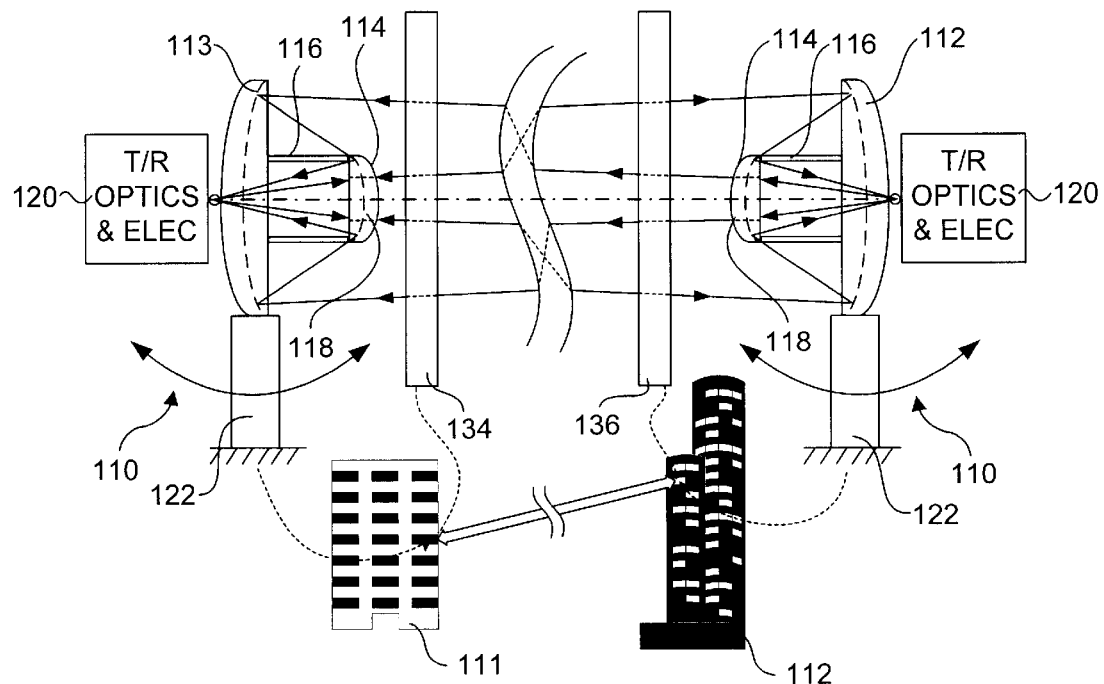
FIG. 1A is an illustration of a conventional free-space optical communications system that uses on-axis primary and secondary reflectors and provides transmitting and receiving capabilities at a pair of transceiver stations disposed at remote locations within respective buildings.
Figure 1B:
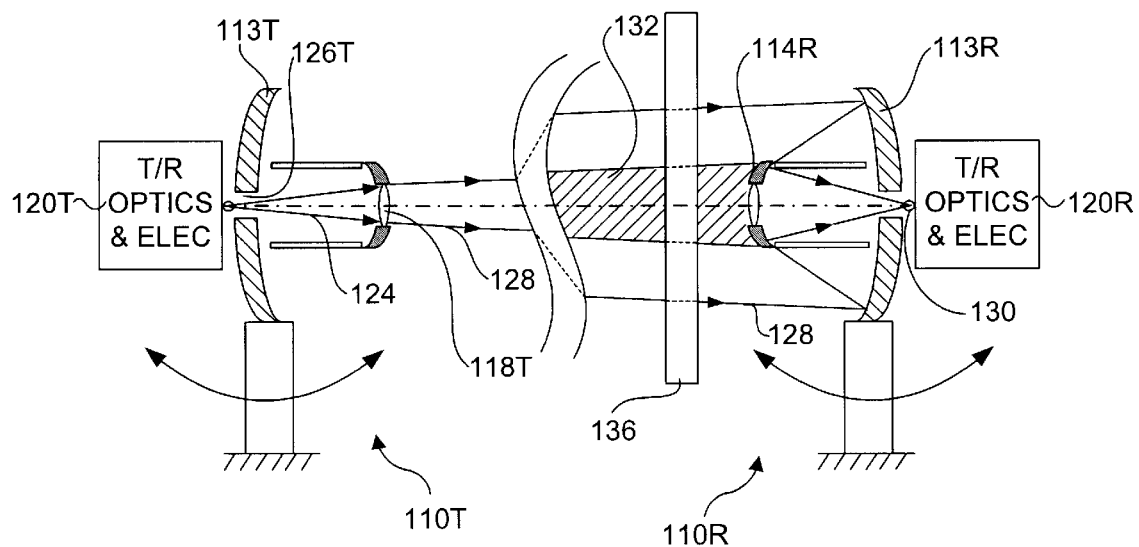
FIG. 1B shows how an optical communications signal is transmitted by a first transceiver station and received by a second transceiver station.
Figure 2:
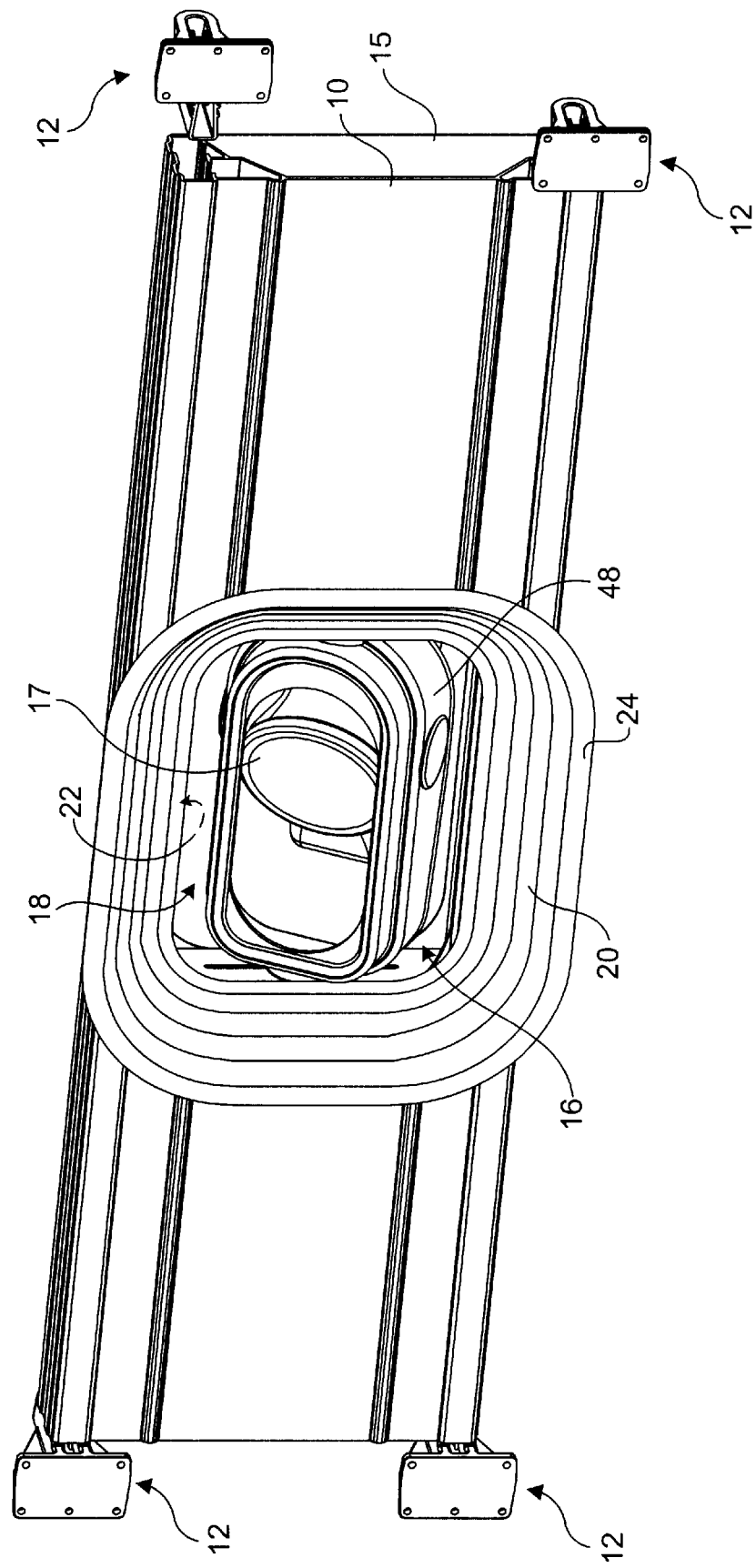
FIG. 2 is a first isometric view of the mounting apparatus of the invention as viewed from outside a window to which the apparatus is mounted (window and window frame removed)
Figure 3:
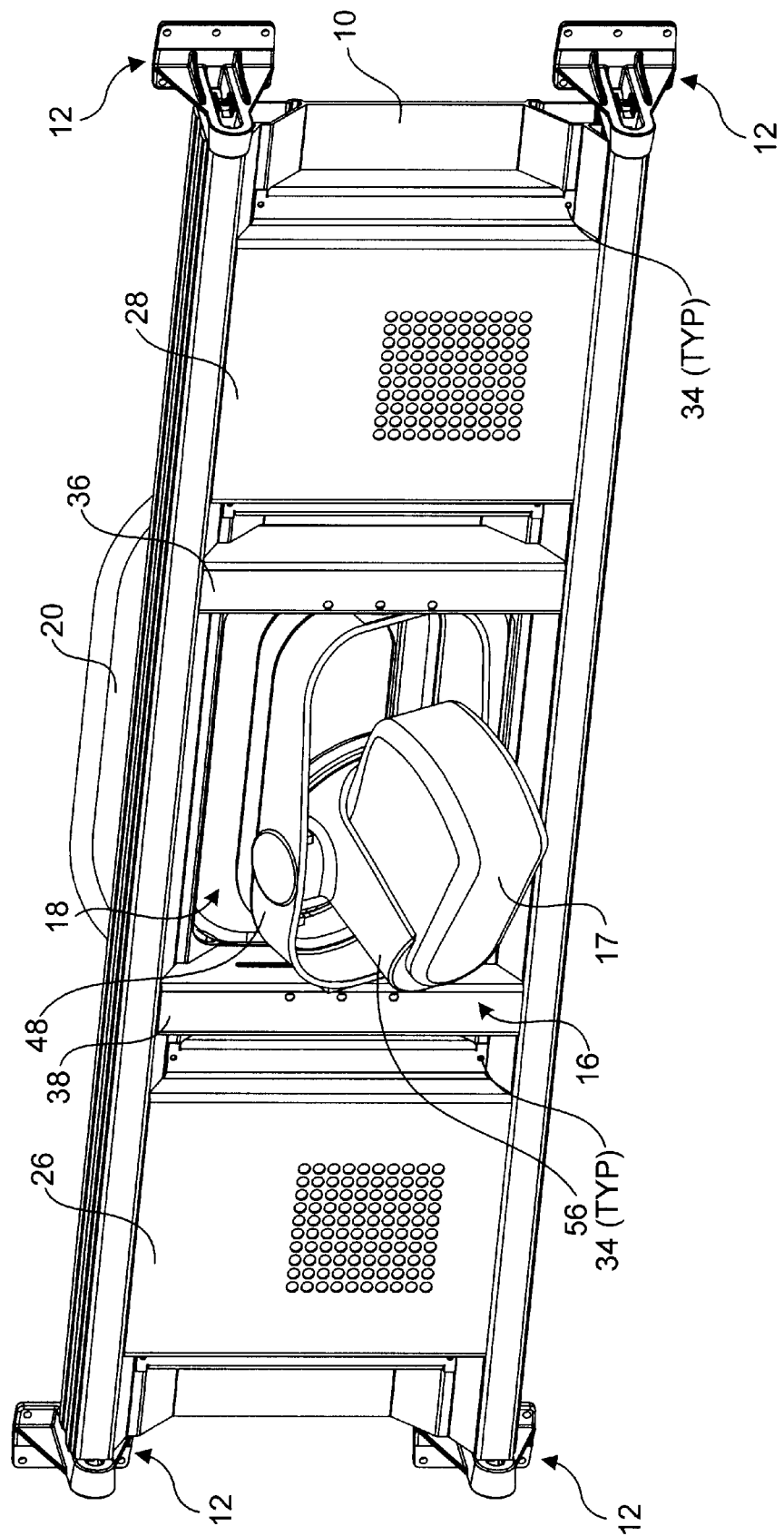
FIG. 3 is a second isometric view of the mounting apparatus as view from within an office or room in which containing a window to which the apparatus is mounted (window and window frame removed)
Figure 4:
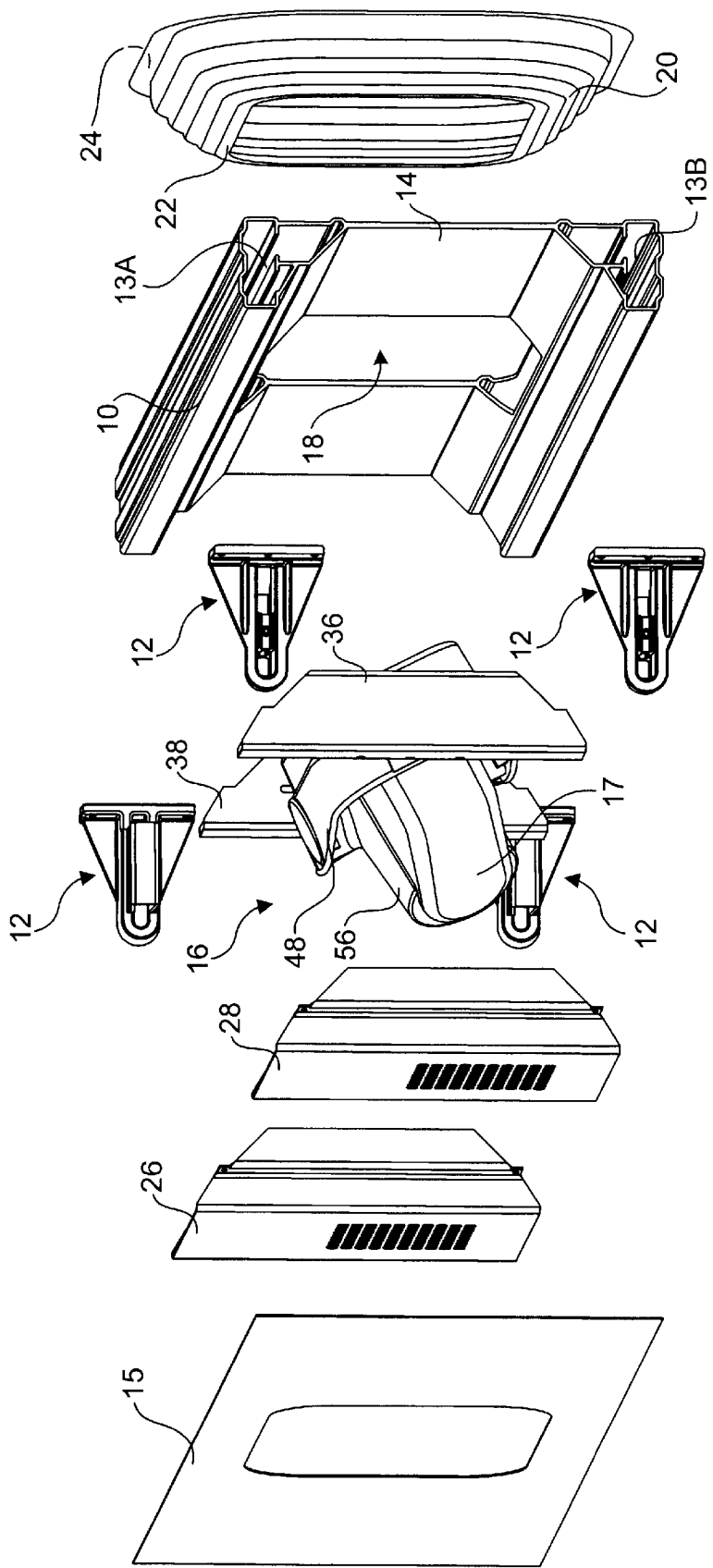
FIG. 4 is an exploded view of the mounting apparatus of the invention.

Interior and exterior views of an apparatus for mounting an FSO terminal in accordance with the invention are shown in FIGS. 2 and 3 respectively. The mounting apparatus includes a frame member 10 to which a plurality of universal mounts 12 are fixedly coupled at respective corners of the frame member. As explained in further detail below, the universal mounts are adapted to mount to either a window or window frame in a variety of configurations to rigidly attach the frame member to the window or frame. In one embodiment, frame member 10 comprises an extrusion that may be cut to a desired length based on the width of the window or window frame to which the apparatus is installed. As shown in FIG. 4, the extrusion has a profile comprising a pair of symmetric closed sections 13A and 13B joined by a web section 14. In one embodiment, a face sheet 15 is riveted or otherwise fixedly secured to the open side of the extrusion to stiffen the frame member. Typically, both of the extrusion and face sheet will be made of an aluminum alloy suitable for extrusions and welding. Optionally, other types of materials may be used for the extrusion and face sheet as well, including various metals and plastics.

A gimbaled support 16 that operatively couples an FSO terminal 17 to frame member 10 is disposed toward a central portion of the frame member. An opening 18 defined in a central portion of frame member 10 and face sheet 15 enables light to be transmitted from and received by the FSO terminal, as well as enabling adjustment of the gimbaled support. In one embodiment, a flexible bellows 20 provides a first mounting surface 22 that is mounted to a peripheral area of opening 18 and a second mounting surface that forms a seal with the window (not shown) to which the apparatus is mounted. Accordingly, the flexible bellows prevent dust and other particles from occupying the airspace encompassed by the flexible bellows, which includes the airspace through which transmitted and received light paths for the FSO terminal pass and prevents people occupying rooms in which the apparatus is installed from interfering with the FSO terminal signals.

Figure 5A:
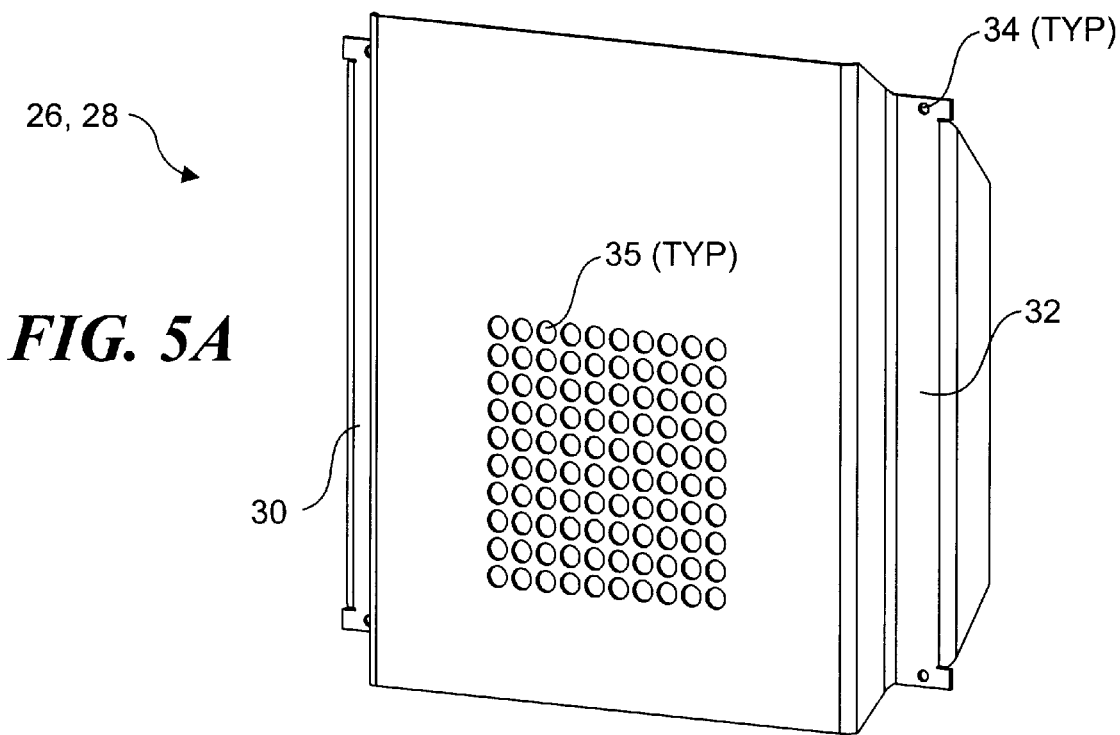
FIGS. 5A and 5B respectively show exterior and interior views of an electronic enclosure cover that is installed within the frame member of the apparatus to provide an enclosed housing in which electronics may be contained.
Figure 5B:
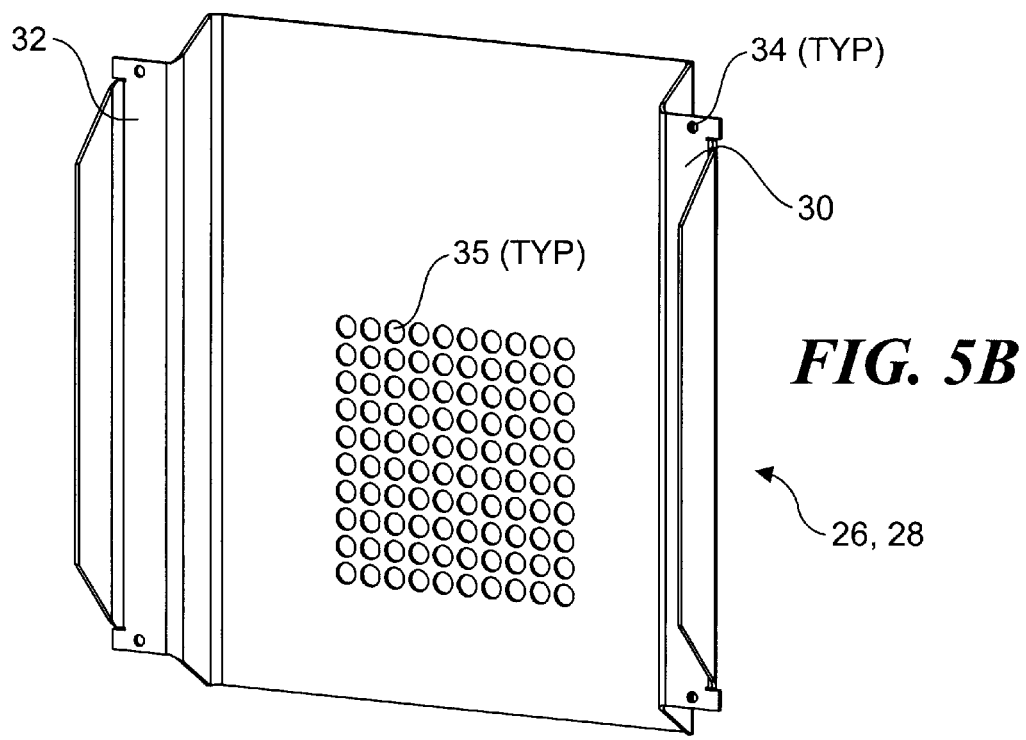
Figure 6:
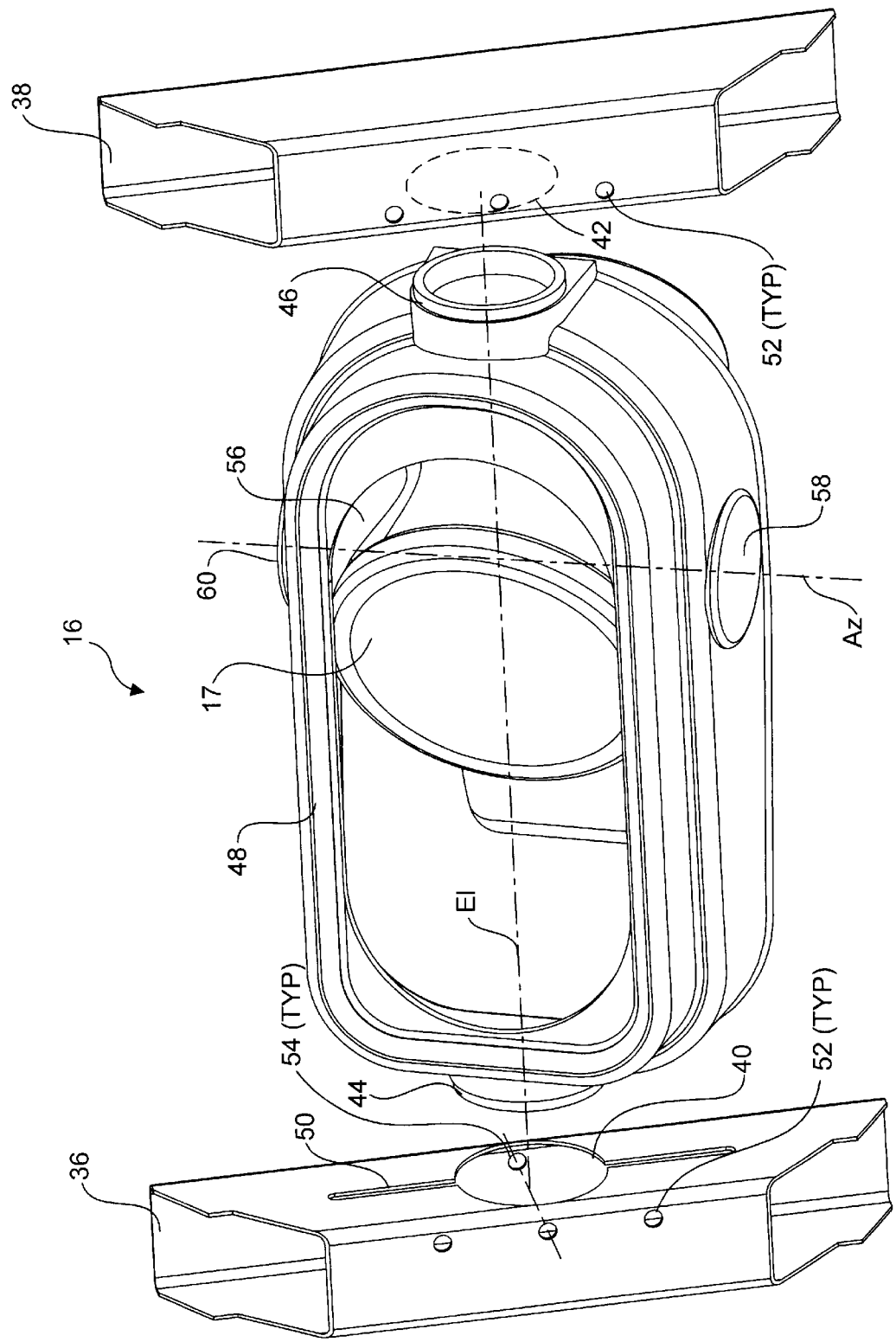
FIG. 6 is an exploded view of a gimbaled support that is coupled to the frame member and enables an FSO terminal to be rotated about two substantially orthogonal elevational and azimuth spin axes.

With reference to FIG. 3, wherein face sheet 15 has been removed for clarity, the apparatus also includes a pair of electronic enclosure covers 26 and 28 in which electronic components for the FSO terminal may generally be housed (in addition to the electron components contained in the housing of FSO terminal 17). As shown in FIGS. 5A and 5B, each of enclosure covers 26 and 28 is formed of sheet metal, and includes a pair of steps 30 and 32 in which mounting holes 34 are defined for mounting the enclosure covers to frame member 10. In the illustrated embodiment, the enclosure covers are adapted to fit the profile of the extrusion used for the frame member. In one embodiment, enclosure covers 26 and 28 further includes a plurality of holes 35 to assist in cooling electronics that are enclosed by the enclosure covers.

Further details of gimbaled support 16 are shown in FIGS. 6 and 7A–C. The gimbaled support includes a pair of support frame members 36 and 38 that are secured to frame member 10 on opposing sides of opening 18. In one embodiment, support frame members 36 and 38 are made from metal tubes that are cut in a configuration to match the profile of the extrusion and welded to the frame member. Respective holes 40 and 42 are defined in support frame members 36 and 38 for receiving respective stub shafts 44 and 46 of an outer gimbal frame 48, thereby providing a trunnion mount for the gimbal frame along an elevational (El) axis upon assembly to the support frame members.

Each support frame member further includes an elongated slot 50 passing through holes 40, 42 and a plurality of hole pairs 52 and 54, wherein each hole pair includes a hole 52 defined on one side of the frame member and a hole 54 defined on the opposite side of the frame member. The elongated slot and hole pairs enable the tension on the trunnion mounts for outer gimbal frame 48 to be adjusted, including locking the rotational position about the El axis by tightening screws (not shown) that have a shank portion that passes through holes 54 and a threaded portion that either is threaded into a nut (not shown) disposed on the outside of holes 52 or is threaded into threads formed in holes 52.

An inner gimbal frame 56 is pivotally coupled to outer gimbal frame 48 via a pair of trunnion mounts 58 and 60 to enable the inner gimbal frame to be rotated about a "spin" or azimuth axis "Az." Trunnion mounts 58 and 60 include a means for adjusting their tension such that the rotational position of the inner gimbal frame 56 may be locked, thereby locking the position of FSO terminal 17, which is fixedly coupled to the inner gimbal frame.

Figure 7A:
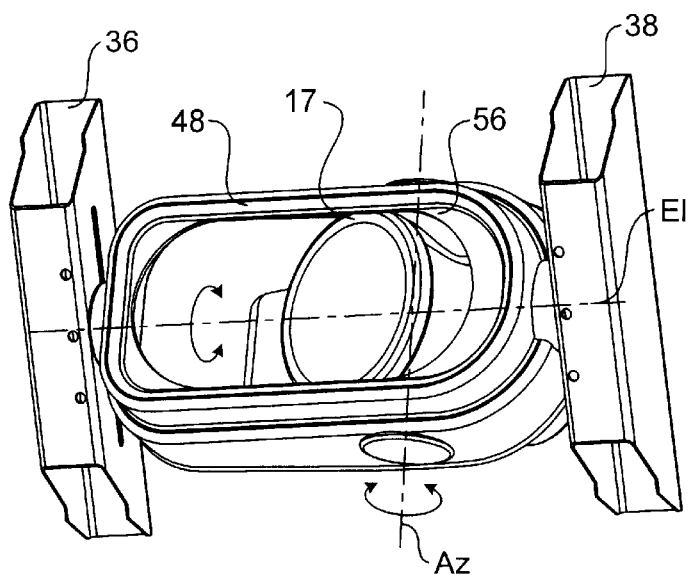
Figure 7B:
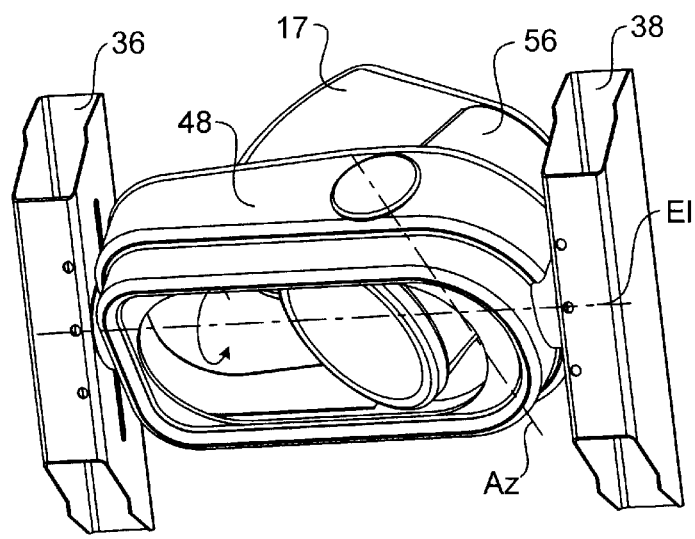
Figure 7C:
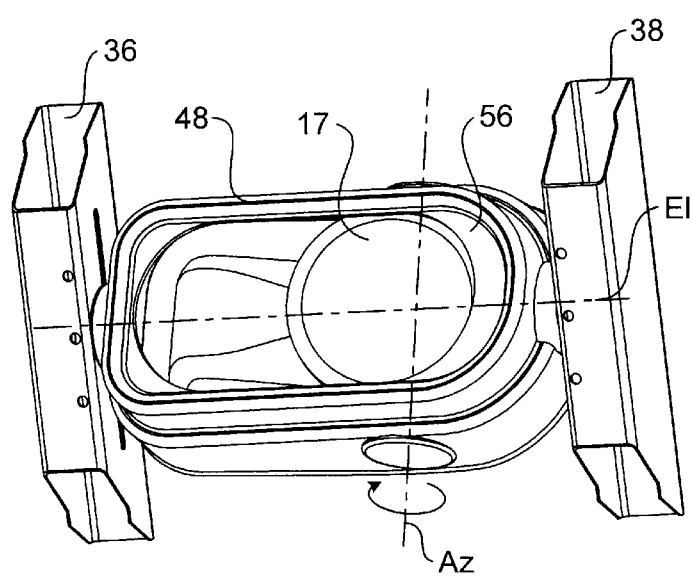

Gimbaled support 16 allows FSO terminal 17 to be rotated about both the El and Az axes to enable the terminal to be oriented in a desired "pointing" configuration and then locked into that configuration. Various exemplary configurations are shown in FIGS. 7A–C.

Figure 8:
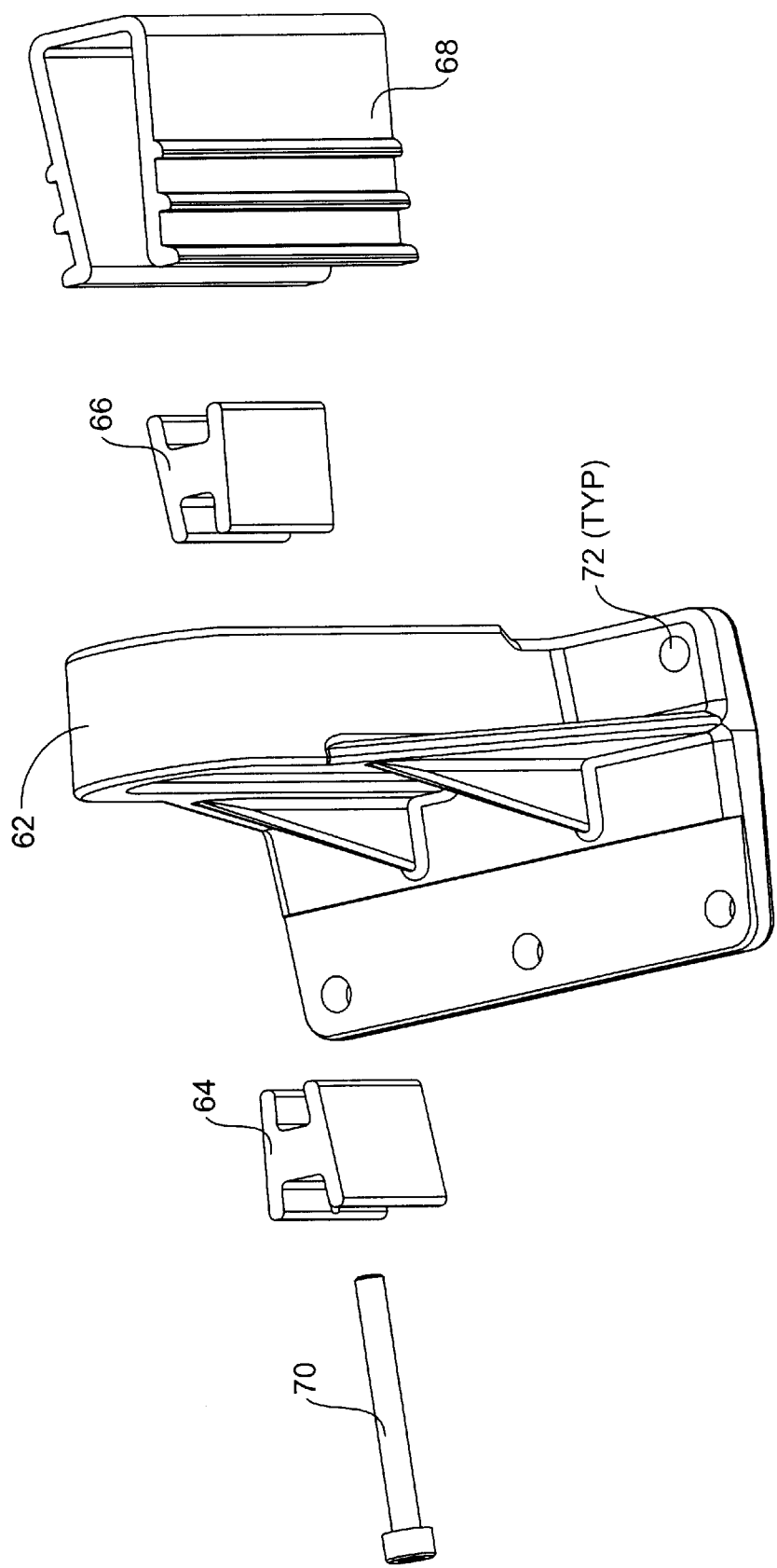
FIG. 8 is an exploded view of a universal mounting bracket that provides adjustments about three degrees of freedom.
Figure 9A:
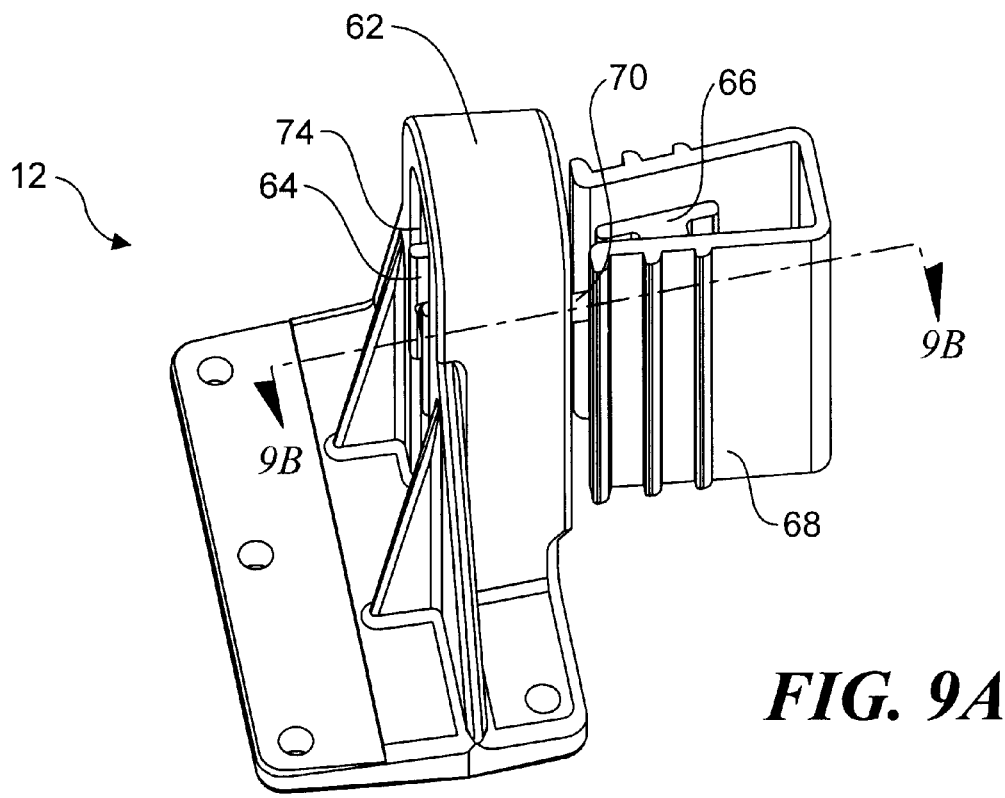
FIG. 9A is an isometric assembled view of the mounting bracket of FIG. 8.

Exploded and assembled views of universal mount 12 are shown in FIGS. 8 and 9A, respectively. Universal mount 12 includes a mounting bracket 62, wedge blocks 64 and 66, and expansion clip 68, and a bolt 70. In one embodiment, mounting bracket 62 includes a plurality of holes 72 to enable the mounting bracket to be secured to a window frame using a plurality of fasteners (not shown). In another embodiment, an adhesive or high-performance double-sided tape is affixed to the underside of the base of mounting bracket to enable the mounting bracket to be secured directly to a window or window frame.

Figure 9B:
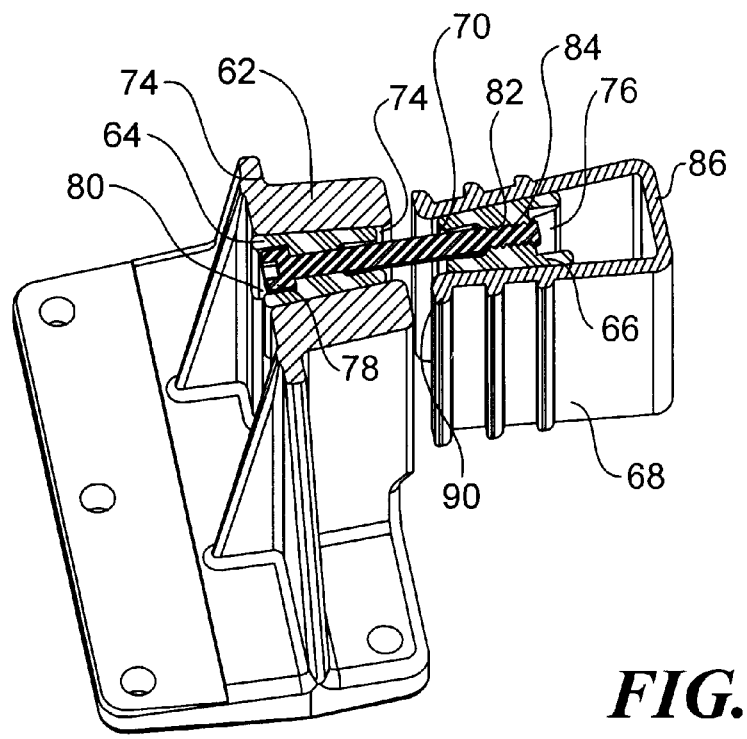
FIG. 9B is a cut-away isometric view of the assembly of FIG. 9A taken along section cut 9B—9B.
Figure 10:
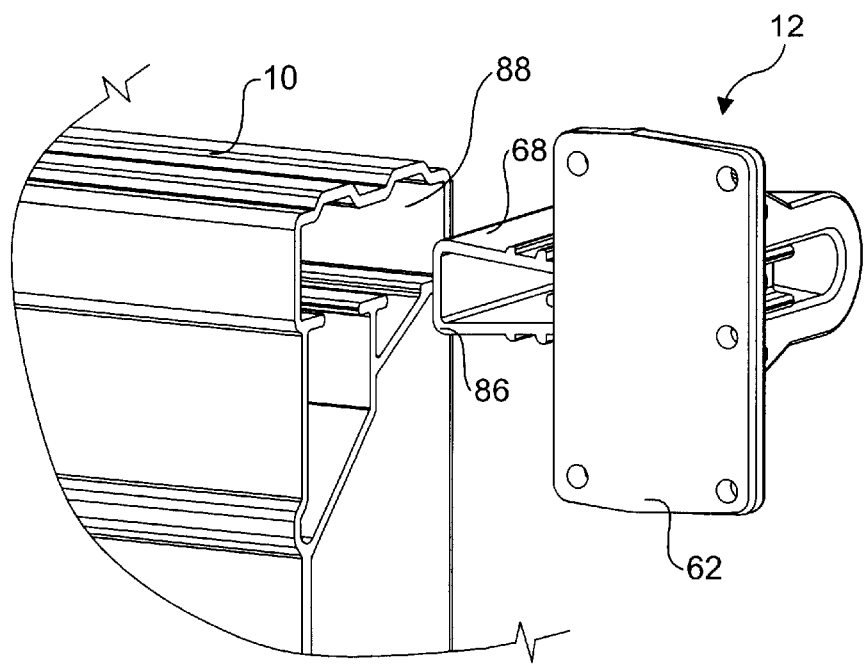
FIG. 10 is an isometric view of the universal mounting bracket and a cross-section of an extrusion portion of the frame member two which an expansion clip of the universal mounting bracket is coupled upon assembly.

With reference to FIGS. 9B and 10, the mounting bracket operates in a following manner. Wedge block 64 is disposed within a slot 74 formed in mounting bracket 62 having a profile that substantially matches the profile of wedge block 64. Similarly, wedge block 66 is disposed within the slotted profile 76 of expansion clip 68, where the slotted profile has a profile that substantially matches the profile of wedge block 66. A head 78 of bolt 70 is disposed within a slot 80 defined in wedge block 64, while a threaded end 82 of bolt 70 is threaded into a threaded hole 84 defined in a central portion of wedge block 66. Meanwhile, as shown in FIG. 10, a closed end 86 of expansion clip 68 is disposed within a mating profile 88 defined in frame member 10.

As bolt 70 is tightened, wedge blocks 64 and 66 are drawn toward each other, causing wedge block 64 to be wedged further into slot 74, substantially locking wedge block 64 to mounting bracket 62. At the same time, wedge block 66 causes an open end 90 of expansion clip 68 to expand, simultaneously expanding closed end 86, causing expansion clip 68 to engage the inside of mating profile 88 and secure wedge block 66 to expansion clip 68. The result is that mounting bracket 62 becomes fixedly secured to frame member 10.

Figure 11A:
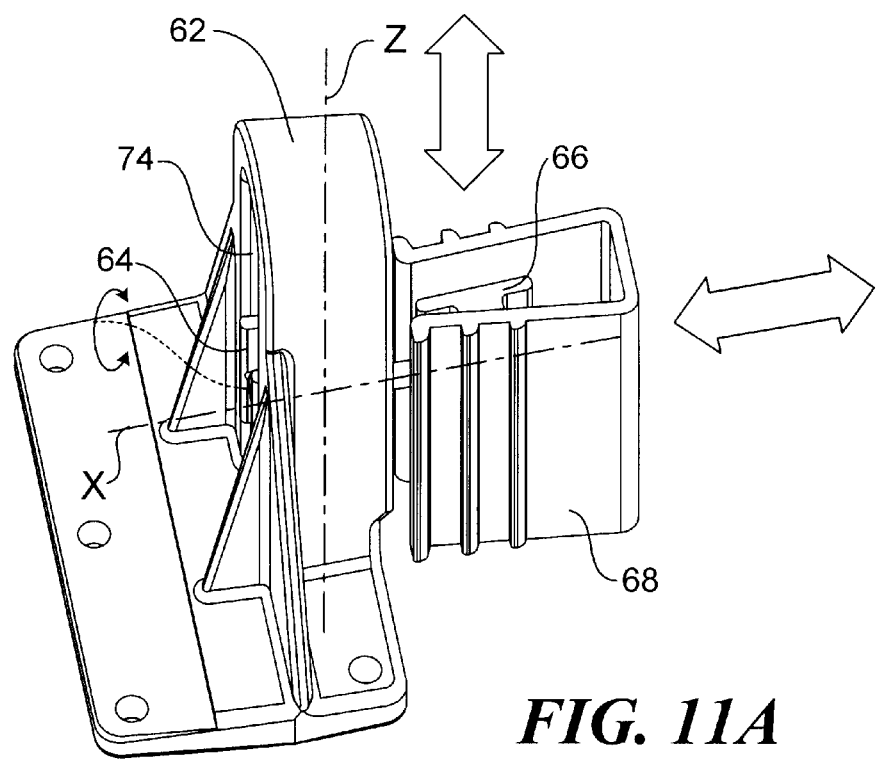
FIG. 11A illustrates a linear positioning of the expansion clip of the universal mounting bracket along a Z axis and an X axis along which the universal mounting bracket may also be positioned.
Figure 11B:
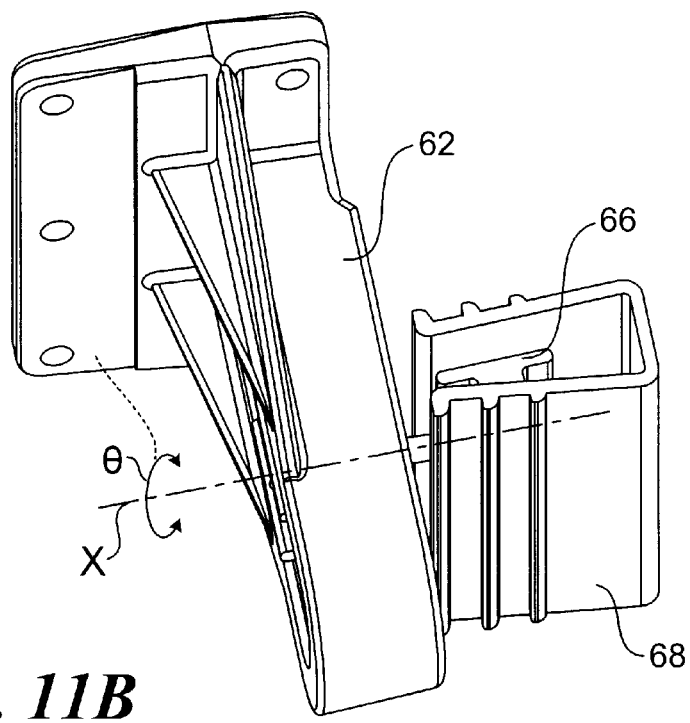
FIG. 11B illustrates a rotational displacement of the bracket of the universal mounting bracket about the X axis.

The universal mounting bracket is termed "universal" in respect to its ability to adapt to various mounting configurations. More specifically, it provides three simultaneous degrees of freedom of adjustments, including linear displacements along X and Z axes and rotation θ about the X axis. For example, linear displacements about the X axis is provided by simply turning bolt 70 clockwise or counterclockwise, while linear displacements about the Z axis can be accomplished by positioning wedge block 64 at different positions within slot 64 (as depicted in FIG. 11A, wherein wedge block 64 has been displaced downward toward the base of mounting bracket 62) and/or positioning wedge block 66 at different positions within expansion clip 66. The linear degree of freedom along the Z axis enables frame member 10 to be positioned within a desired distance from the window to accommodate various window frame configurations. In addition, the rotational degree of freedom enables the mounting bracket to be mounted to the top of a window frame as well as the sides of the window frame, as exemplified in FIG. 11B, wherein mounting bracket 62 has been rotated 90 degrees about the X axis.

Figure 12:
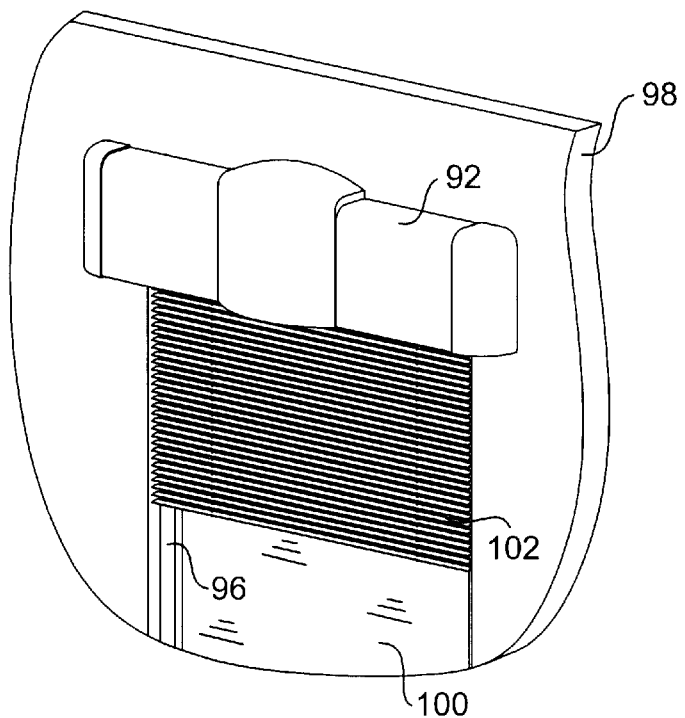
FIG. 12 is an isometric view of a typical installation in which the apparatus is mounted to the upper portion of a window frame and includes a valance that is used for security and aesthetic purposes.
Figure 13:
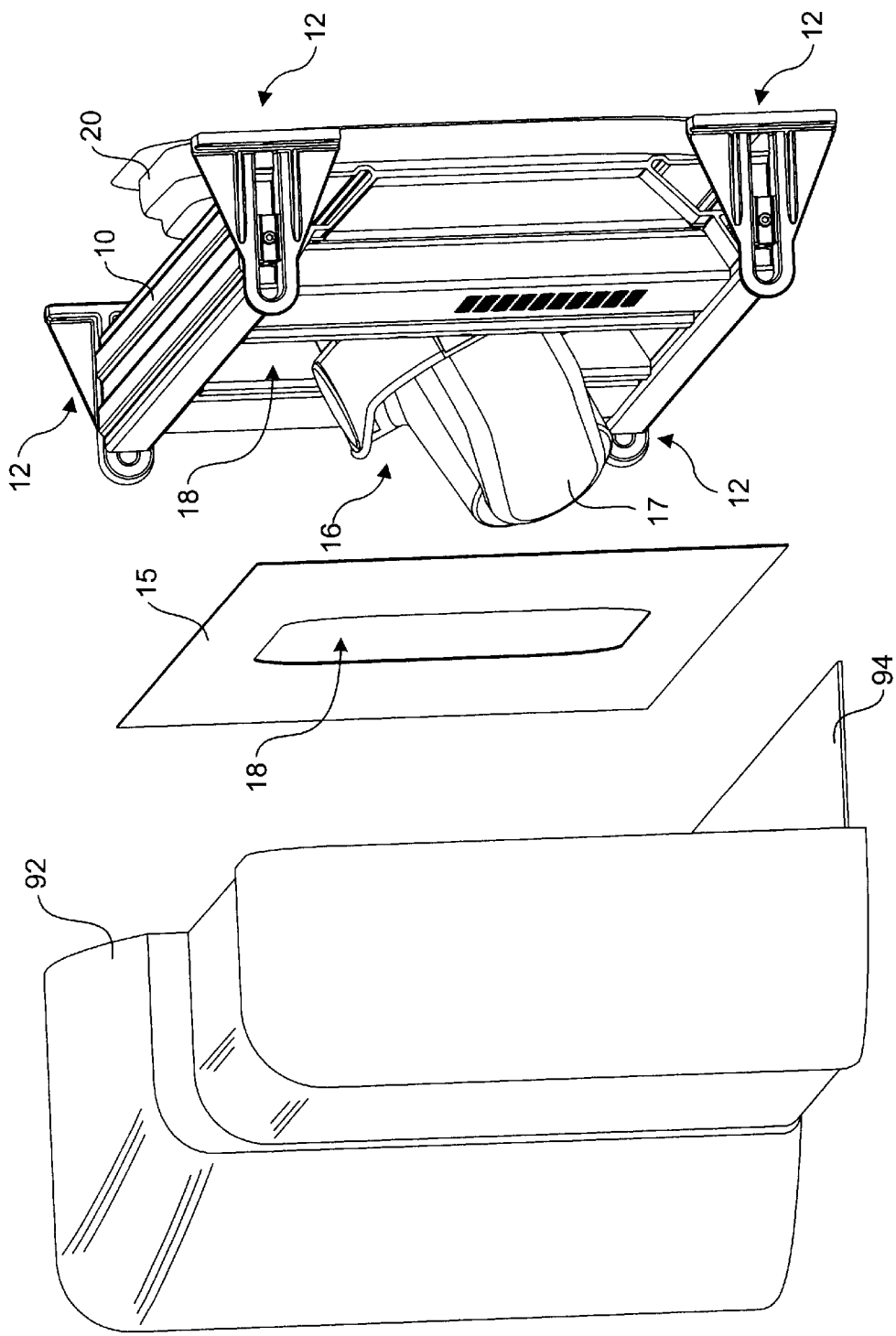
FIG. 13 is an exploded isometric view illustrating the valance of FIG. 12.

In one embodiment, the apparatus further includes a valance cover, as shown in FIGS. 12 and 13. As shown in FIG. 13, valance cover 92 is adapted to fit around the apparatus assembly so as to enclose the assembly, and includes a flange 94 to prevent unwanted assess to the gimbaled support 16 of FSO terminal 17 once installed in a window frame to a window. A typical installation is depicted in FIG. 12, wherein the apparatus is installed towards an upper portion of a window frame 96 set in a wall pane 98. Optionally, all or a portion of universal mounts 12 may be directly attached to window 100. After the apparatus has been installed, and the orientation of FSO terminal 17 has been adjusted and locked via gimbaled support 16, valance cover 92 is placed over the cover and secured to frame member 10 or is otherwise secured to the apparatus or window frame 96.

In addition to preventing unwanted access, valance cover 92 provides an aesthetic housing that makes the FSO terminal installation less intrusive to people who occupy the office or room the FSO terminal is installed in. As shown in FIG. 12, in one embodiment, a conventional blind 102 may be secured to the bottom of flange 94 (or otherwise secured to window frame 96.

The invention provides several advantages over the conventional mounting techniques. It achieves rigidity by spacing the attachment points so that they span the width of the window, wherein the FSO hardware is located in the center of the frame. By comparison, a cantilevered design would have significantly more deflection and have much lower rigidity. The apparatus permits the widest range of view angles since it locates the FSO hardware as close to the glass as possible. For example, in one embodiment the transceiver aperture is located only 3.5 inches from the glass for all possible view angles. The apparatus design precludes a user from obstructing the view of the FSO equipment by incorporating a flexible bellows that seals the telescope aperture against the window glass. This provides the added benefit of additional eye safety as well as protection from dust and moisture.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and Figures are accordingly to be regarded as illustrative rather than restrictive. Furthermore, it is not intended that the scope of the invention in any way be limited by the above description, but instead be determined entirely by reference to the claims that follow.

What is claimed is:

1. An apparatus for mounting a free-space optical communications system (FSO) terminal relative to a window, comprising:
    a frame member, having a substantially rectangular configuration in which a central opening is defined through a central portion thereof;

a plurality of mounting brackets, adapted to be mounted to the window or a window frame in which the window is disposed, each of said plurality of mounting brackets operatively coupled to the frame member toward a respective corner of the frame member; and a support, pivotally coupled to the frame member, wherein the support can pivot in two spin axes, and providing a mounting interface adapted to couple to the FSO terminal such that the FSO terminal is pivotally coupled to the frame member within its central opening upon assembly of the FSO terminal to the support.

2. The apparatus of claim 1, wherein the support comprises a gimbal yoke that is pivotally coupled to the frame member on at least one side of the central opening so as to define a first spin axis, said gimbal yoke further including a means for pivotally coupling the FSO terminal to the gimbal yoke so as to define a second spin axis that is substantially orthogonal to the first spin axis.

3. The apparatus of claim 2, wherein the gimbal yoke has a substantially oval configuration and is pivotally mounted to the frame member via a pair of trunnion mounts disposed on opposing ends of the gimbal yoke.

4. The apparatus of claim 2, wherein the gimbal yoke includes a pair of trunnion mounts disposed on opposing sides of the FSO terminal, whereby the FSO terminal is pivotally coupled to the gimbal yoke via the trunnion mounts upon assembly so as to enable rotation of the FSO terminal about the second spin axis.

5. The apparatus of claim 1, further comprising a flexible bellows having a first end mounted around a periphery of the central opening and a second end that forms a seal with the window upon assembly of the apparatus to the window.

6. The apparatus of claim 1, wherein the frame member comprises an extrusion having a cutout formed in a central portion thereof corresponding to the central opening.

7. The apparatus of claim 6, further comprising a stiffener sheet that is fixedly secured to peripheral portions of the extrusion so as to stiffen the frame member.

8. The apparatus of claim 6, wherein the extrusion has a profile comprising a pair of closed end sections connected via a web.

9. The apparatus of claim 1, further comprising at least one electronic enclosure integrated into the frame member.

10. The apparatus of claim 1, wherein each of the plurality of mounting brackets are slidingly coupled to the frame member such that a distance between the frame member and a mounting surface of each mounting bracket may be adjusted once the mounting brackets are mounted to the window or window frame, and further wherein each of the plurality of mounting brackets may be locked in configuration once the distance between the frame member and the mounting surfaces has been adjusted such that the frame member is rigidly coupled to the window or window frame.

11. The apparatus of claim 1, wherein each of the plurality of mounting brackets is pivotally coupled to the frame member to enable each mounting bracket to be positioned independently by rotating the mounting bracket relative to longitudinal axis of the frame member, and further wherein each mounting bracket can be locked in configuration after it has been positioned such that the frame member is rigidly coupled to the window or window frame.

12. The apparatus of claim 1, wherein each of the plurality of mounting brackets is universally coupled to the frame member to enable each mounting bracket to be positioned independently by rotating and/or moving the mounting bracket linearly relative to the frame member, and further wherein each mounting bracket can be locked in configuration after it has been positioned such that the frame member is rigidly coupled to the window or window frame.

13. The apparatus of claim 12, wherein each of the plurality of mounting brackets comprises:

a bracket having a base coupled to an upright portion in which a wedge-shaped slot is defined;

a first wedge block, have a wedge-shaped profile substantially matching the wedge-shaped slot of the bracket having a portion thereof engaging opposing services of the wedge-shaped slot upon assembly and having a hole passing therethrough;

an expansion clip, having an open wedge-shaped profile including a pair of sidewalls disposed within respective mating walls defined in the frame member upon assembly;

a second wedge block, disposed within the expansion clip upon assembly, having a threaded hole passing therethrough; and a bolt having a head portion engaging the first wedge block and a shank passing through the hole in the first wedge block and a threaded end received by the threaded hole in the second wedge block upon assembly, wherein tightening the bolt causes the first and second wedge blocks to be urged toward each other, substantially locking the first wedge block to the bracket, and causing the expansion clip to expand such that the side walls of the expansion clip engage the mating walls of the frame member to substantially lock the expansion clip within the frame member.

14. The apparatus of claim 1, further comprising a valance cover that is attached to the frame member and is disposed over the frame member such that the apparatus appears as a common window valance when viewed from within an office in which the apparatus is installed and to protect the FSO terminal from damage or tampering by workers in the office.

15. A method for mounting a free-space optical communications system (FSO) terminal to a window, comprising:

mounting a frame member, having a substantially rectangular configuration in which a central opening is defined through a central portion thereof to a window via a plurality of mounting brackets that are mounted to the window or a window frame in which the window is disposed, each of said plurality of mounting brackets operatively coupled to the frame member toward a peripheral portion of the frame member; and mounting the FSO terminal to a support that is operatively coupled to the frame member such that the FSO terminal is operatively coupled to the frame member within its central opening.

16. The method of claim 15, wherein the support comprises a gimbal yoke that is pivotally coupled to the frame member on at least one side of the central opening so as to define a first spin axis, said gimbal yoke further including a means for pivotally coupling the FSO terminal to the gimbal yoke so as to define a second spin axis that is substantially orthogonal to the first spin axis.

17. The method of claim 16, wherein the gimbal yoke has a substantially oval configuration and is pivotally mounted to the frame member via a pair of trunnion mounts disposed on opposing ends of the gimbal yoke.

18. The method of claim 16, wherein the gimbal yoke includes a pair of trunnion mounts disposed on opposing sides of the FSO terminal, whereby the FSO terminal is pivotally coupled to the gimbal yoke via the trunnion mounts upon assembly so as to enable rotation of the FSO terminal about the second spin axis.

19. The method of claim 15, wherein the plurality of mounting brackets are mounted to the window using an adhesive.

20. The method of claim 15, wherein the plurality of mounting brackets are mounted to the window frame using an adhesive.

21. The method of claim 15, wherein the plurality of mounting brackets are mounted to the window frame using a plurality of fasteners.

22. The method of claim 15, further comprising disposing a flexible bellows between the frame member and the window such that a first end of the flexible bellows forms a seal with the window and second end of the flexible bellows is coupled to peripheral portions of the central opening in the frame member.

23. The method of claim 15, wherein the frame member is mounted toward a top of the window, further comprising attaching a valance cover to the frame member or the window frame so as to make an assembly comprising the frame member and mounting brackets appear as a common window valance.

24. An apparatus for mounting a free-space optical communications system (FSO) terminal to a window, comprising:
 a frame member, having a substantially rectangular configuration in which a central opening is defined through a central portion thereof;
 a plurality of mounting brackets, each having a substantially planar mounting surface, adapted to be mounted to a window pane, each of said plurality of mounting brackets operatively coupled to the frame member toward a respective corner of the frame member, wherein the mounting surfaces are coplanar and
 a support, operatively coupled to the frame member and providing a mounting interface adapted to couple to the FSO terminal such that the FSO terminal is operatively coupled to the frame member within its central opening upon assembly of the FSO terminal to the support.

* * * * *